United States Patent
Chan et al.

(10) Patent No.: US 8,116,025 B1
(45) Date of Patent: Feb. 14, 2012

(54) DISK DRIVE EXECUTING RETRY OPERATION AFTER ADJUSTING JOG VALUE IN RESPONSE TO GAIN CONTROL

(75) Inventors: Tom S. Chan, San Marino, CA (US); Chun Sei Tsai, Tustin, CA (US); Carl E. Barlow, Lake Forest, CA (US); Colin W. Morgan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 161 days.

(21) Appl. No.: 12/338,798

(22) Filed: Dec. 18, 2008

(51) Int. Cl.
*G11B 5/596* (2006.01)
*G11B 27/36* (2006.01)

(52) U.S. Cl. ............... 360/77.06; 360/31; 360/78.04
(58) Field of Classification Search .......... None
See application file for complete search history.

(56) References Cited

U.S. PATENT DOCUMENTS

| | | | |
|---|---|---|---|
| 5,379,162 A * | 1/1995 | Cunningham et al. | 360/53 |
| 5,461,517 A * | 10/1995 | Suda et al. | 360/53 |
| 5,721,816 A | 2/1998 | Kusbel et al. | |
| 6,043,946 A | 3/2000 | Genheimer et al. | |
| 6,122,235 A | 9/2000 | Arai | |
| 6,188,538 B1 | 2/2001 | Mills et al. | |
| 6,317,850 B1 | 11/2001 | Rothberg | |
| 6,405,342 B1 | 6/2002 | Lee | |
| 6,643,084 B1 | 11/2003 | Andrew et al. | |
| 6,650,491 B2 | 11/2003 | Suzuki et al. | |
| 6,920,005 B2 | 7/2005 | Yun | |
| 7,002,765 B2 | 2/2006 | Lum et al. | |
| 7,023,645 B1 * | 4/2006 | Emo et al. | 360/75 |
| 7,088,535 B2 | 8/2006 | Kim et al. | |
| 7,136,244 B1 | 11/2006 | Rothberg | |
| 7,215,494 B2 | 5/2007 | Wang et al. | |
| 7,522,365 B1 * | 4/2009 | Chen | 360/53 |
| 2001/0028522 A1 | 10/2001 | Suzuki et al. | |
| 2005/0052770 A1 | 3/2005 | Osafune | |

* cited by examiner

*Primary Examiner* — Andrew L Sniezek (57) ABSTRACT

A disk drive is disclosed comprising a disk having a plurality of tracks, wherein each track comprises a plurality of data sectors. A head is actuated radially over the disk for generating a read signal. A first read of a data sector is performed while adjusting an amplitude of the read signal in response to a gain control setting. When an error occurs while attempting to first read the data sector, a first jog value is generated in response to the gain control setting. The head is served over the data sector in response to the first jog value, and a second read of the data sector is performed.

18 Claims, 7 Drawing Sheets

DISK DRIVE EXECUTING RETRY OPERATION AFTER ADJUSTING JOG VALUE IN RESPONSE TO GAIN CONTROL

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording data sectors and servo sectors. The servo sectors comprise head positioning information (e.g., a track address) which is read by the head and processed by a servo control system to control the velocity of the actuator arm as it seeks from track to track.

If an error occurs while attempting to read one of the data sectors, the disk drive may execute an error recovery procedure wherein the data sector may be reread multiple times while adjusting various parameters, such as channel settings (fly-height adjustment, equalizer adjustment, etc.), or a servo setting such as a jog value which specifies a track offset (an offset from the nominal data track centerline). In the past, the disk drive has swept the jog value over a range of settings in an attempt to recover a data sector which can require multiple retries until the correct jog value is located.

DETAILED DESCRIPTION OF EMBODIMENTS OF THE INVENTION

Figures 1A, 1B, 1C:
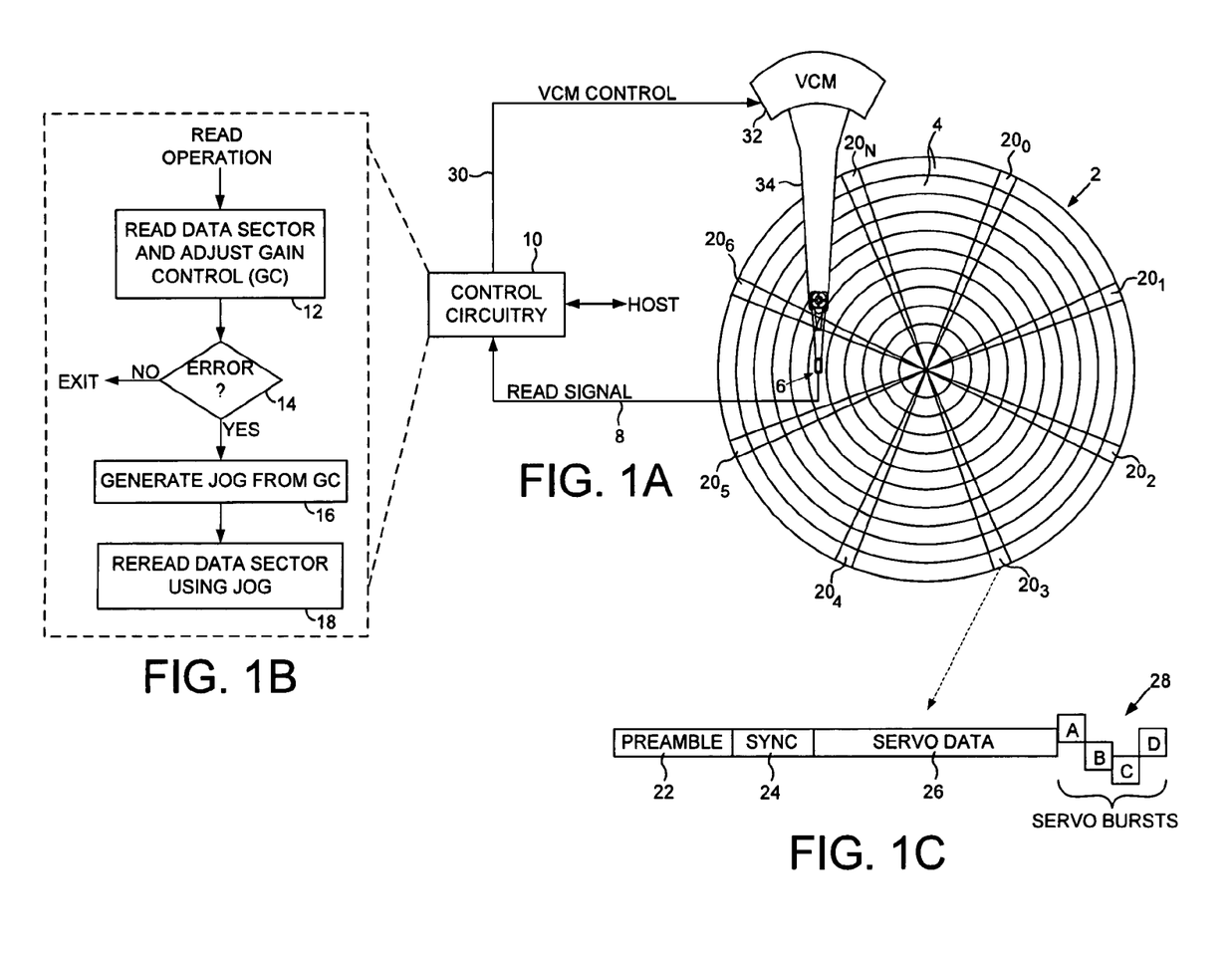
FIG. 1A shows a disk drive according to an embodiment of the present invention comprising a disk having a plurality of tracks comprising servo sectors and data sectors, a head actuated over the disk, and control circuitry.
FIG. 1B is a flow diagram executed by the control circuitry wherein a jog value is generated from a gain control setting while initially reading a data sector, wherein the jog value is used to reread the data sector during a retry operation according to an embodiment of the present invention.
FIG. 1C shows a format of a servo sector.

FIG. 1A shows a disk drive comprising a disk 2 having a plurality of tracks 4, wherein each track comprises a plurality of data sectors. A head 6 is actuated radially over the disk 2 for generating a read signal 8. The disk drive further comprises control circuitry 10 for executing the flow diagram of FIG. 1B. A first read of a data sector is performed while adjusting an amplitude of the read signal in response to a gain control setting (step 12). When an error occurs while attempting to first read the data sector (step 14), a first jog value is generated in response to the gain control setting (step 16). The head is served over the data sector in response to the first jog value, and a second read of the data sector is performed (step 18).

In the embodiment of FIG. 1A, the disk 2 comprises a plurality of embedded servo sectors $20_0$-$20_N$ which define a plurality of data tracks. In an embodiment shown in FIG. 1C, each servo sector (e.g., servo sector $20_3$) comprises a preamble 22 for synchronizing gain control and timing recovery, a sync mark 24 for synchronizing to a data field 26 comprising coarse head positioning information (such as a Gray coded track address), and servo bursts 28 which provide fine head positioning information. The control circuitry 10 processes the read signal 8 emanating from the head 6 to demodulate the servo sectors into a position error signal (PES). The PES is filtered with a suitable compensation filter to generate a control signal 30 applied to a VCM 32 which rotates an actuator arm 34 about a pivot in a direction that reduces the PES.

Figure 1D:
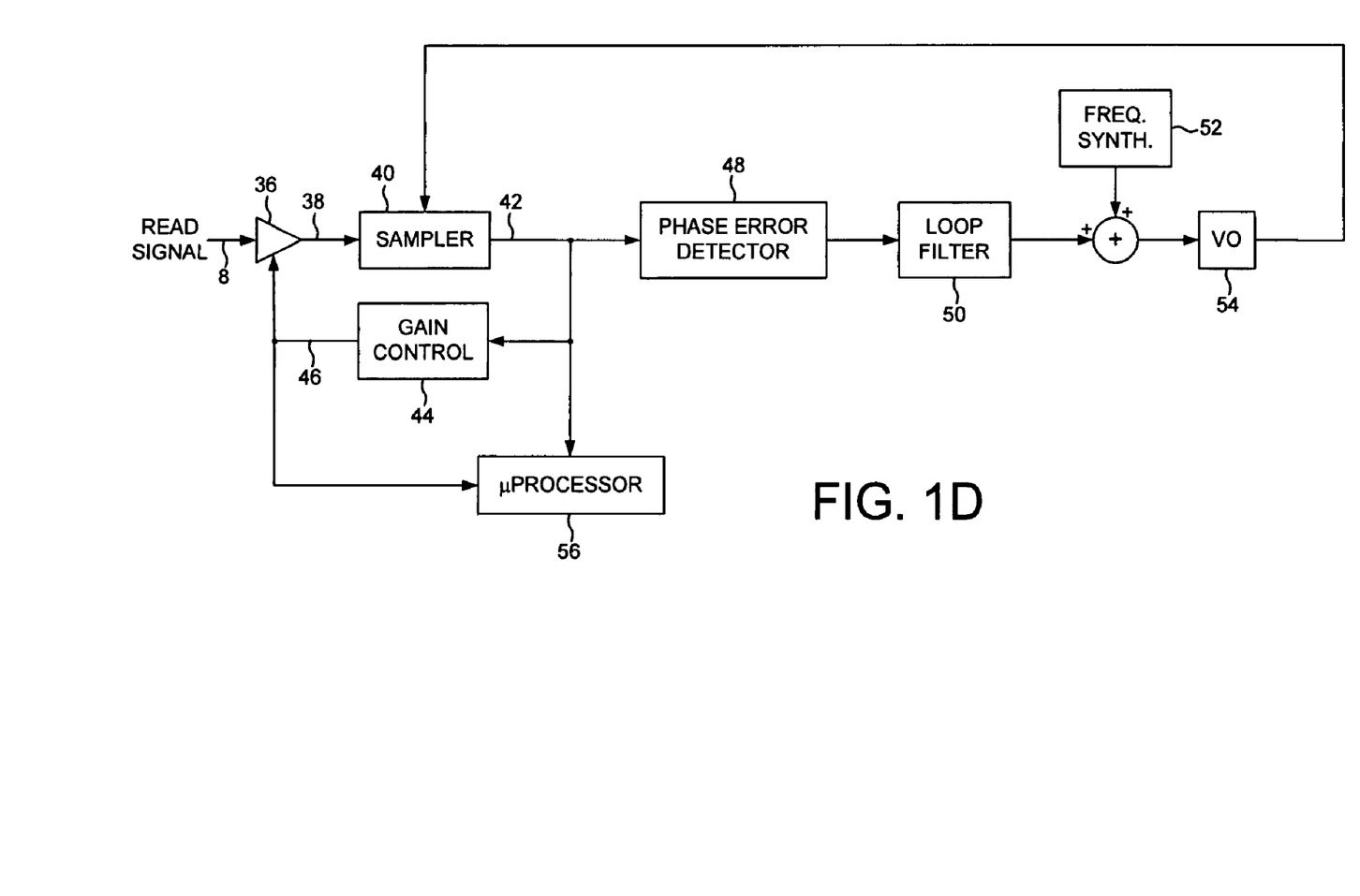
FIG. 1D shows control circuitry according to an embodiment of the present invention wherein the gain control setting adjusts a variable gain amplifier.

FIG. 1D shows control circuitry according to an embodiment of the present invention. The read signal 8 is amplified by a variable gain amplifier 36, and the amplified read signal 38 sampled by a sampling device 40 (e.g., an A/D converter) to generate a sequence of read signal sample values 42. A gain control circuit 44 processes the sample values 42 to generate a gain control signal 46 used to adjust the variable gain amplifier 36. In one embodiment, the gain control circuit 44 adjusts the variable gain amplifier 36 so that the amplitude of the sample values 42 match a target response, such as a suitable partial response (e.g., PR4, ERP4, etc.). In the embodiment of FIG. 1D, a frequency of the sampling device 40 is adjusted using suitable timing recovery circuitry, which may include a phase error detector 48, a loop filter 50, a frequency synthesizer 52, and a variable oscillator 54. The timing recovery circuitry synchronizes the sampling frequency relative to a target response; however, other forms of timing recovery may be employed, such as interpolated timing recovery wherein the read signal is sampled asynchronously and the asynchronous samples interpolated to generate the synchronous samples.

If a first attempt to read a data sector from a data track fails, the gain control setting is evaluated to determine whether the cause of the failure may be due to the head being miss-aligned from the center of the data track. An off-track error will cause the amplitude of the read signal 8 to decrease since the head is not fully over the data track. Therefore, if the gain control setting indicates a low amplitude read signal 8, a corresponding jog value is generated and used to offset the head during a retry operation.

In the embodiment of FIG. 1D, the gain control signal 46 is the gain control setting used to generate the jog value for the retry operation. A microprocessor 56 processes the gain control signal 46 to generate the jog value as described in greater detail below. Other embodiments may employ a digital gain control circuit which may adjust the amplitude of the sample values 42 in discrete time using a digital scalar which may be the gain control setting used to generate the jog value for the retry operation.

Figure 2A:
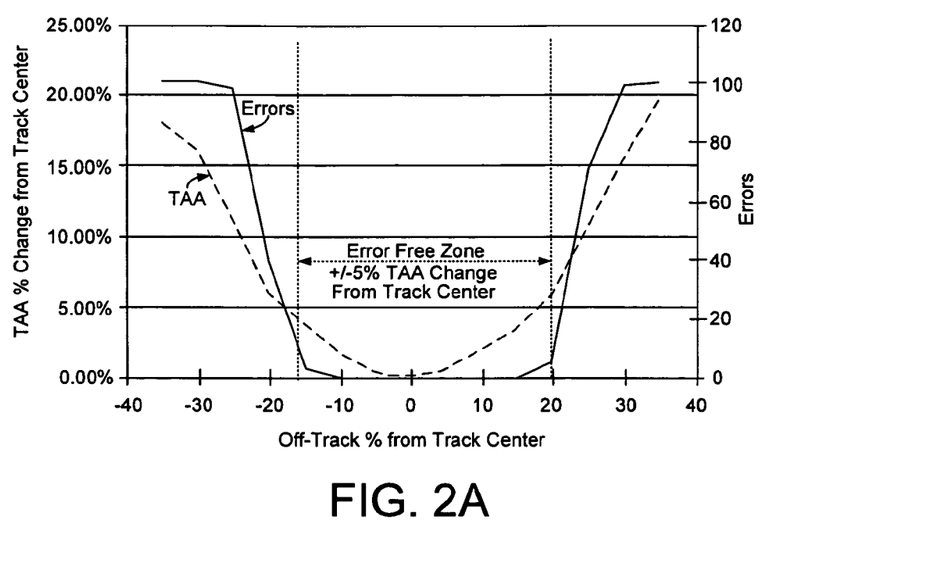
FIG. 2A illustrates an example of how the read signal track average amplitude (TAA) changes as the head deviates from the center of a data track according to an embodiment of the present invention.

FIG. 2A illustrates an example of how the read signal track average amplitude (TAA) changes (in percentage relative to a nominal TAA) as the head deviates from the center of a data track according to an embodiment of the present invention. In this embodiment, the graph illustrates that the data track is essentially error free (recoverable using an error correction code) for a TAA percentage change ranging from plus/minus five percent. When the TAA percentage change exceeds five percent, it indicates an unrecoverable data sector is likely caused by an off-track error.

Figure 2B:
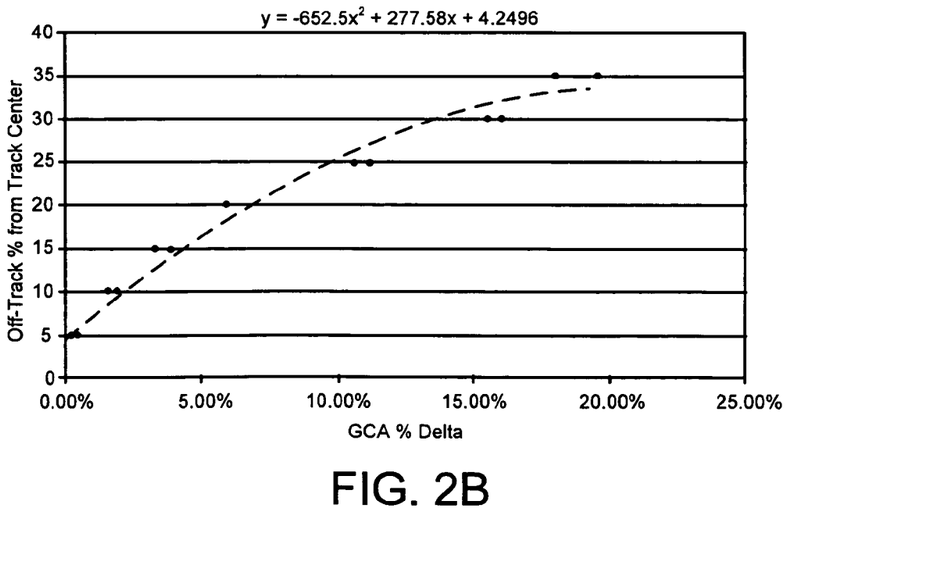
FIG. 2B shows an embodiment of the present invention wherein a gain control delta while reading a data sector is correlated with a jog value corresponding to an off-track percentage.

FIG. 2B shows an embodiment of the present invention wherein a gain control delta while reading a data sector is correlated with a jog value corresponding to an off-track percentage. Accordingly, a jog value for use during a retry operation can be generated relative to the gain control delta during the initial read operation. The jog value determined according to this embodiment may represent a better estimate of the actual off-track offset and it may be determined much faster than sweeping a jog value through a range of values as in the prior art.

Figure 3:
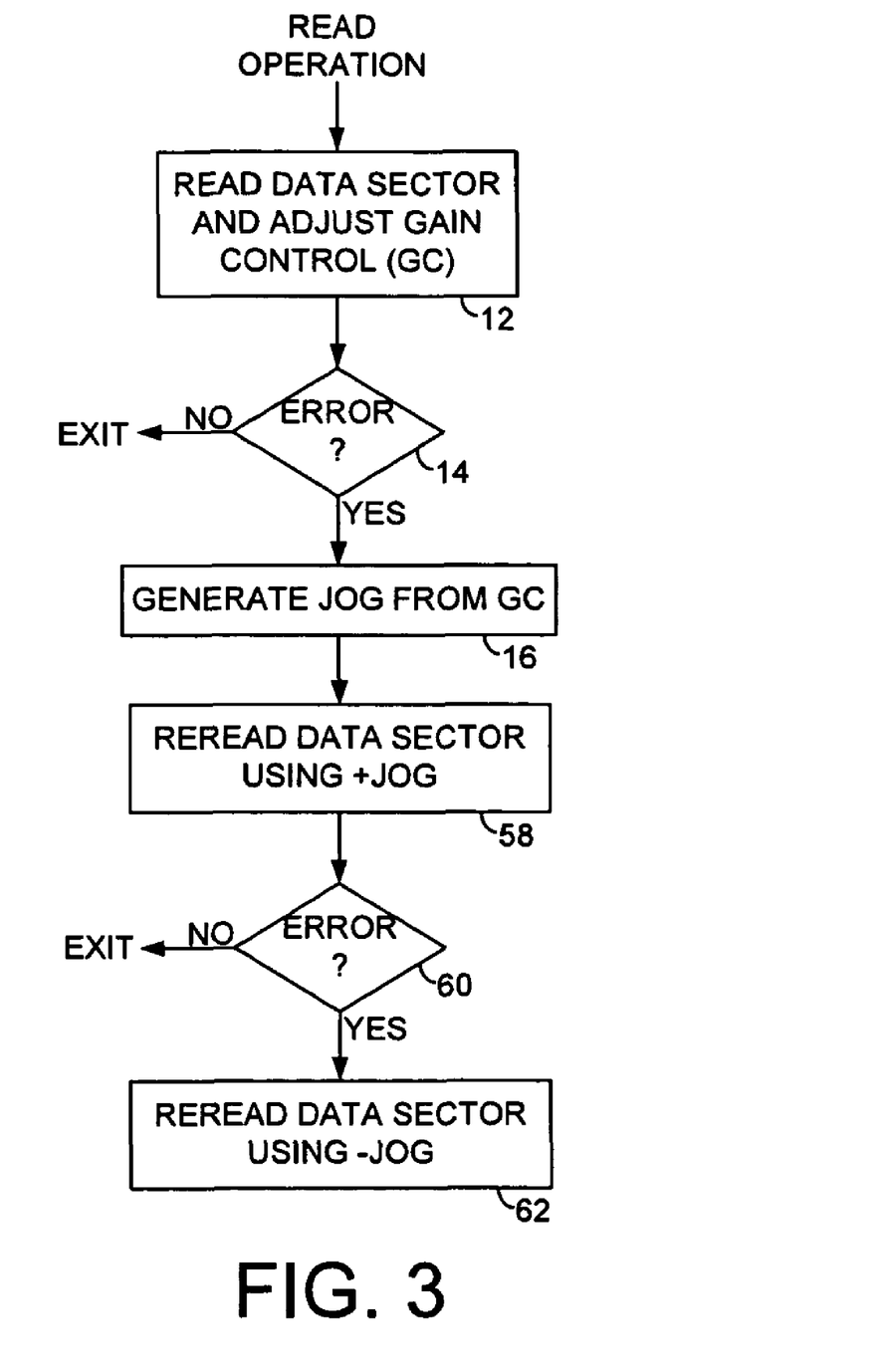
FIG. 3 is a flow diagram according to an embodiment of the present invention wherein a data sector may be reread using a positive jog value, and if the reread fails, the data sector is reread with a negative jog value.

FIG. 3 is a flow diagram according to an embodiment of the present invention which extends the flow diagram of FIG. 1B. When an error occurs while reading a data sector (step 14), the data sector is reread (step 58) using a positive jog value generated in response to the gain control setting. If the data sector is still unrecoverable (step 60), the data sector is reread (step 62) using a negative jog value generated in response to the gain control setting. In other words, the control circuitry positions the head at an off-track offset on a first side of the initial data track position, and if that fails, the control circuitry positions the head at the off-track offset on the opposite side of the initial data track position.

Figure 4:
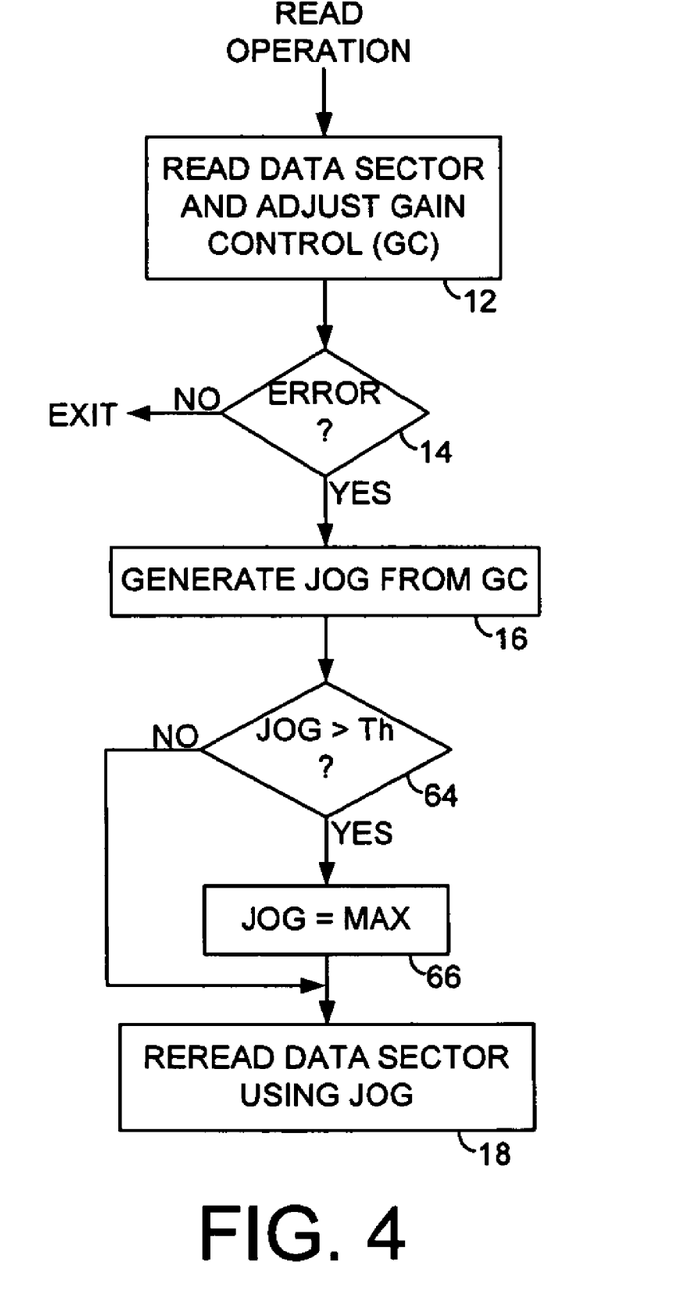
FIG. 4 is a flow diagram according to an embodiment of the present invention wherein the jog value is limited to a maximum value.

FIG. 4 is a flow diagram according to an embodiment of the present invention which extends the flow diagram of FIG. 1B. When an error occurs while reading a data sector (step 14) and the jog value is generated (step 16), the jog value is compared to a threshold (step 64). If the jog value exceeds the threshold, then the jog value is set to a maximum value (step 66) in order to limit the jog value used during the retry operations.

Figure 5A:
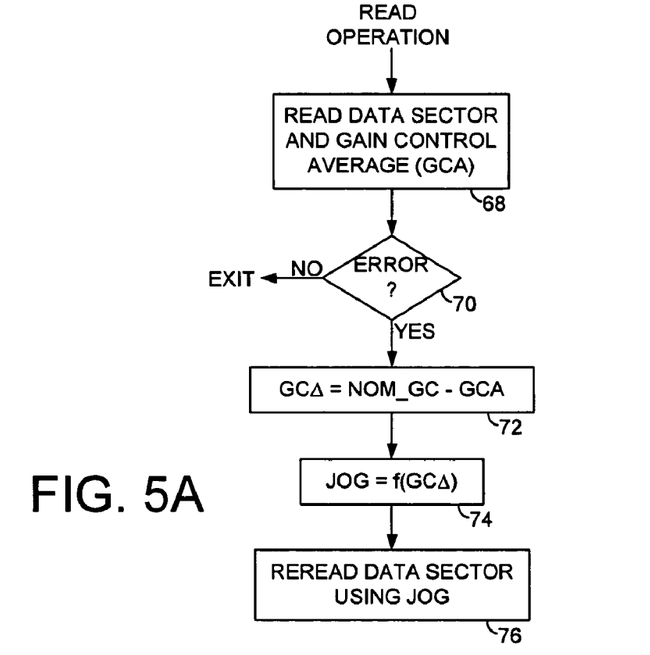
FIG. 5A is a flow diagram according to an embodiment of the present invention wherein a gain control delta is generated as a difference between a nominal gain control and a gain control average when reading the data sector, and the jog value is generated as a function of the gain control delta.

FIG. 5A is a flow diagram according to an embodiment of the present invention wherein the gain control setting while reading a data sector is averaged to generate a gain control average (step 68). In one embodiment, the gain control setting is averaged over the entire data sector, and in another embodiment, the gain control setting is averaged only over the preamble of the data sector. When an error occurs while attempting to first read a data sector (step 70), a gain control delta is computed as the difference between a nominal gain control setting and the gain control average (step 72). In one embodiment, the gain control delta may be computed as a percentage change from the nominal gain control setting by dividing the difference by the nominal gain control setting. The jog value is then computed as a function of the gain control delta (step 74), where the function may be determined using a suitable curve fitting technique such as the polynomial shown in FIG. 2B. The data for performing the curve fitting may be collected for a subset of disk drives and the resulting function employed in each production disk drive. In an alternative embodiment shown in the flow diagram of FIG. 5B, a table of jog values may be generated from the collected data wherein the gain control delta is used as an index into the table (step 78).

Figure 5B:
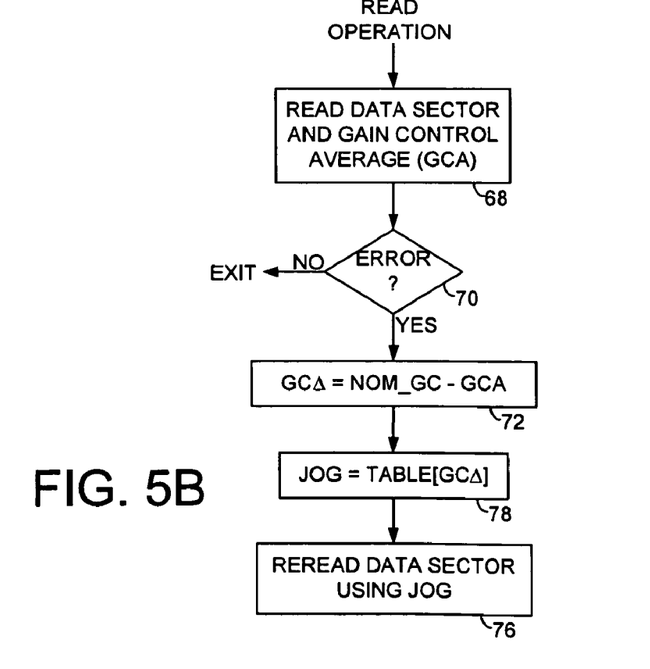
FIG. 5B is a flow diagram according to an embodiment of the present invention wherein the jog value is generated from a lookup table indexed by the gain control delta.
Figure 6:
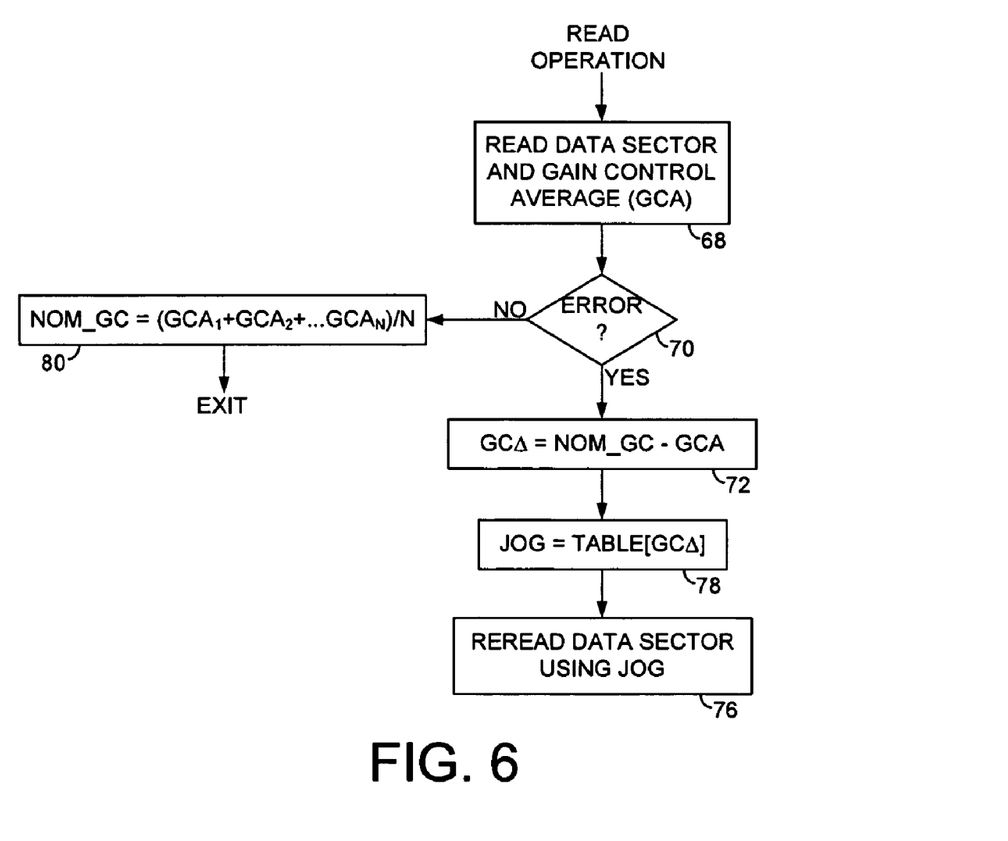
FIG. 6 is a flow diagram according to an embodiment of the present invention wherein if a data sector is read successfully, the nominal gain control is updated using the gain control average.

FIG. 6 is a flow diagram according to an embodiment of the present invention which extends on the flow diagram of FIG. 5B. When the first read of a data sector is successful (step 70), the nominal gain control setting is adjusted in response to the gain control average (step 80). In the embodiment of FIG. 6, the nominal gain control setting is updated by computing a running average of the previous N gain control averages. This embodiment may help compensate for changes in environmental conditions (e.g., ambient temperature) which may affect the nominal gain control setting over time.

In another embodiment, the nominal gain control setting may be adjusted relative to a sensed environmental condition (e.g., a sensed ambient temperature). For example, in one embodiment the disk drive estimates the ambient temperature (e.g., using a suitable temperature sensor) which then indexes a table of corresponding nominal gain control settings (or used to compute the nominal gain control setting using a suitable function).

In one embodiment, a nominal gain control setting may be generated for multiple zones over the radius of the disk. This embodiment may help compensate for changes in the nominal gain control setting due to the skew angle of the head, or changes in the tracks per inch (TPI) at different radial locations. For example, a higher amplitude write current may be used to write data tracks having a lower TPI and therefore the corresponding nominal gain control setting may be lower for lower TPI tracks.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of tracks, wherein each track comprises a plurality of data sectors;
    a head actuated radially over the disk for generating a read signal; and
    control circuitry operable to:
        first read a data sector while adjusting an amplitude of the read signal in response to a gain control setting; and
        when an error occurs while attempting to first read the data sector:

generate a first jog value in response to the gain control setting relative to a nominal gain control value;
servo the head over the data sector in response to the first jog value;
second read the data sector; and
when the first read is successful, adjust the nominal gain control value.

2. The disk drive as recited in claim 1, wherein when an error occurs when attempting to second read the data sector, the control circuitry is further operable to:
generate a second jog value having a polarity opposite the first jog value;
servo the head over the data sector in response to the second jog value; and
third read the data sector.

3. The disk drive as recited in claim 1, wherein the control circuitry is further operable to adjust the first jog value when the first jog value exceeds a threshold.

4. The disk drive as recited in claim 1, wherein the control circuitry is further operable to generate the jog value by averaging the gain control setting while reading the data sector to generate a gain control average.

5. The disk drive as recited in claim 4, wherein the control circuitry is further operable to generate the jog value by computing a gain control delta relative to a difference between the gain control average and the nominal gain control value.

6. The disk drive as recited in claim 5, wherein the control circuitry is further operable to generate the jog value as a function of the gain control delta.

7. The disk drive as recited in claim 5, wherein the control circuitry is further operable to generate the jog value by indexing a lookup table with the gain control delta.

8. The disk drive as recited in claim 5, wherein when the first read is successful, the control circuitry is further operable to adjust the nominal gain control value in response to the gain control average.

9. A method of operating a disk drive, the disk drive comprising a disk having a plurality of tracks, wherein each track comprises a plurality of data sectors, a head actuated radially over the disk for generating a read signal, the method comprising:
first reading a data sector while adjusting an amplitude of the read signal in response to a gain control setting; and
when an error occurs while attempting to first read the data sector:
generating a first jog value in response to the gain control setting relative to a nominal gain control value;
serving the head over the data sector in response to the first jog value;
second reading the data sector; and
when the first read is successful, adjusting the nominal gain control value.

10. The method as recited in claim 9, wherein when an error occurs when attempting to second read the data sector, further comprising:
generating a second jog value having a polarity opposite the first jog value;
serving the head over the data sector in response to the second jog value; and
third reading the data sector.

11. The method as recited in claim 9, further comprising adjusting the first jog value when the first jog value exceeds a threshold.

12. The method as recited in claim 9, further comprising generating the jog value by averaging the gain control setting while reading the data sector to generate a gain control average.

13. The method as recited in claim 12, further comprising generating the jog value by computing a gain control delta relative to a difference between the gain control average and the nominal gain control value.

14. The method as recited in claim 13, further comprising generating the jog value as a function of the gain control delta.

15. The method as recited in claim 13, further comprising generating the jog value by indexing a lookup table with the gain control delta.

16. The method as recited in claim 13, wherein when the first read is successful, further comprising adjusting the nominal gain control value in response to the gain control average.

17. A disk drive comprising:
a disk comprising a plurality of tracks, wherein each track comprises a plurality of data sectors;
a head actuated radially over the disk for generating a read signal; and
control circuitry operable to:
first read a data sector while adjusting an amplitude of the read signal in response to a gain control setting; and
when an error occurs while attempting to first read the data sector:
generate a first jog value by averaging the gain control setting while reading the data sector to generate a gain control average and computing a gain control delta relative to a difference between the gain control average and a nominal gain control value;
servo the head over the data sector in response to the first jog value; and
second read the data sector.

18. A method of operating a disk drive, the disk drive comprising a disk having a plurality of tracks, wherein each track comprises a plurality of data sectors, a head actuated radially over the disk for generating a read signal, the method comprising:
first reading a data sector while adjusting an amplitude of the read signal in response to a gain control setting; and
when an error occurs while attempting to first read the data sector:
generating a first jog value by averaging the gain control setting while reading the data sector to generate a gain control average and computing a gain control delta relative to a difference between the gain control average and a nominal gain control value;
serving the head over the data sector in response to the first jog value; and
second reading the data sector.

* * * * *